United States Patent [19]
Kiritchenko

[11] Patent Number: 5,933,244
[45] Date of Patent: Aug. 3, 1999

[54] METHOD OF ARTICLE IDENTIFICATION THROUGH COLOR DETERMINATION

[75] Inventor: Alexandre Ivanovitch Kiritchenko, Zaporozhye, Ukraine

[73] Assignee: Chipper 2000 (Isle of Man) Limited, Braddan, United Kingdom

[21] Appl. No.: 08/945,615

[22] PCT Filed: Apr. 24, 1996

[86] PCT No.: PCT/GB96/00969

§ 371 Date: Oct. 28, 1997

§ 102(e) Date: Oct. 28, 1997

[87] PCT Pub. No.: WO96/34258

PCT Pub. Date: Oct. 31, 1996

[30] Foreign Application Priority Data

Apr. 28, 1995 [GB] United Kingdom ................... 9508632

[51] Int. Cl.⁶ .................................................. G01J 3/50
[52] U.S. Cl. ........................ 356/402; 356/407; 250/226; 209/580
[58] Field of Search ..................... 356/426, 402, 356/407, 425; 250/226; 209/580, 581, 582

[56] References Cited

U.S. PATENT DOCUMENTS

| | | | |
|---|---|---|---|
| 2,022,327 | 11/1935 | Sheldon | 356/426 X |
| 5,374,988 | 12/1994 | Wertz et al. | 356/402 X |

FOREIGN PATENT DOCUMENTS

| | | |
|---|---|---|
| 0204547 | 12/1986 | European Pat. Off. |
| 204547 | 12/1986 | European Pat. Off. |
| 0315938 | 5/1989 | European Pat. Off. |
| 0315939 | 5/1989 | European Pat. Off. |
| 315938 | 5/1989 | European Pat. Off. |
| 315939 | 5/1989 | European Pat. Off. |
| 0512511 | 11/1992 | European Pat. Off. |
| 512511 AI | 11/1992 | European Pat. Off. |
| WO 89/04468 | 5/1989 | WIPO. |

*Primary Examiner*—F. L. Evans
*Attorney, Agent, or Firm*—Watts, Hoffmann, Fisher & Heinke Co., L.P.A.

[57] ABSTRACT

A method of detecting the color of an article such as gambling chips to permit the different color chips to be sorted. The method comprises sensing the color of the article at a plurality of places thereon by moving the article relative to color sensing means and integrating the color measured with respect to time.

11 Claims, 3 Drawing Sheets

METHOD OF ARTICLE IDENTIFICATION THROUGH COLOR DETERMINATION

This invention concerns a method of color detection and also a method of sorting different colored articles; and particularly but not exclusively a method of detecting the color of and sorting gambling chips, and other rotary symetrical colored articles.

When detecting the colors of, and sorting into different colored groups, articles such as gambling chips, problems can be encountered due to the variation in shades of the chips and/or dirt on the chips. Particular problems have also been encountered with patterned chips. These may have for example a central portion of a different color or colors, and/or bands or patches around the chip.

According to the present invention there is provided a method of detecting the color of an article, the method comprising sensing the color of the article at a plurality of places on the article and integrating the color measured with respect to the number of places sensed.

The article is preferably moved relative to the means sensing the color of the article, during the sensing, to provide the sensing at different places across the article, and the color measured is integrated with respect to time.

The color sensing means preferably divides light received from the article into one or more spectra, and the relative intensities across the or each spectra are measured to determine the color.

The or each spectra measured are preferably divided into bands across the spectra, and the color measured across each band is preferably integrated, desirably with respect to the frequency in each band. The or each spectra measured are preferably converted into discreet spectra.

According to a further aspect of the invention there is provided a method of determining the color of an article, the method comprising sensing the color of the article a plurality of times, with the article in a different orientation to the sensing means at each sensing, and integrating the color measured with respect to the number of senses. The article is preferably detected by a method according to any of the preceding four paragraphs.

The invention further provides a method of sorting articles by virtue of their color, the method comprising measuring one or more test articles by a method according to any of the preceding five paragraphs, measuring an article to be sorted by said method, comparing the color measurements obtained to ascertain whether the article to be sorted corresponds to the or a one of the test articles.

Preferably a plurality of test articles of the or each of the colors for which sorting is required are measured, or a single test article of the or each color for which sorting is required is measured a plurality of times.

An embodiment of the present invention will now be described by way of example only with reference to the accompanying drawings, in which.

Figure 1:
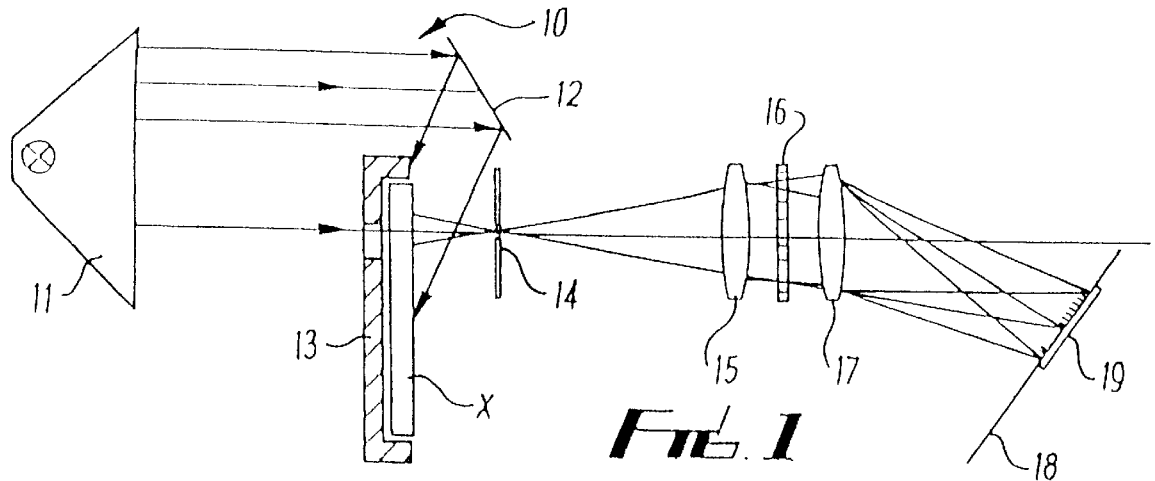
FIG. 1 shows color sensing apparatus usable with a method according to the present invention.

FIG. 1 shows diagrammatically color measurement apparatus 10 for measuring the color of a gambling chip X. Apparatus according to the applicant's co-pending U.K. Patent Application No. 9501359.5 could be used in a method according to the present invention, and the apparatus of FIG. 1 could be incorporated in a device for sorting gambling chips as described in this prior specification.

The apparatus 10 comprises an illuminating halogen lamp 11 provided with a reflector. The lamp 11 faces a downwardly inclined mirror 12 for shining light downwardly onto a gambling chip X held in a chip holder 13. An inlet slit 14 is provided on the far side of the chip X from the lamp 11 for focusing a beam of light from the chip X. Light passing through the slit 14 strikes a collimator lens 15 which transforms the diverging beam of light from the slit 14 into a parallel beam. A no change parallel beam subsequently reaches a diffraction grating 16 which deflects the light of different wavelengths in different angles dependent on the wavelength. The deflected light passes to a focusing lens 17 to focus the parallel beams onto a focal surface 18 in which is installed an optical receiver 19.

If there is no chip in the holder 13, light from the light 11 passes directly through an opening in the holder 13, through the slit 14, the lenses 15 and 17, and grating 16 to reach the receiver 19. The higher intensity of light that is received indicates that there is no chip in the holder 13. The optical receiver is an integrated optical sensor consisting of 64 charge mode pixels arranged in a 64×1 linear array provided with an internal logic circuit. The sensor 19 is located in a position to receive the spectra of the first order and the violet portion of the spectra of the second order, thereby allowing higher accuracy definition of the chip color.

Figure 2:
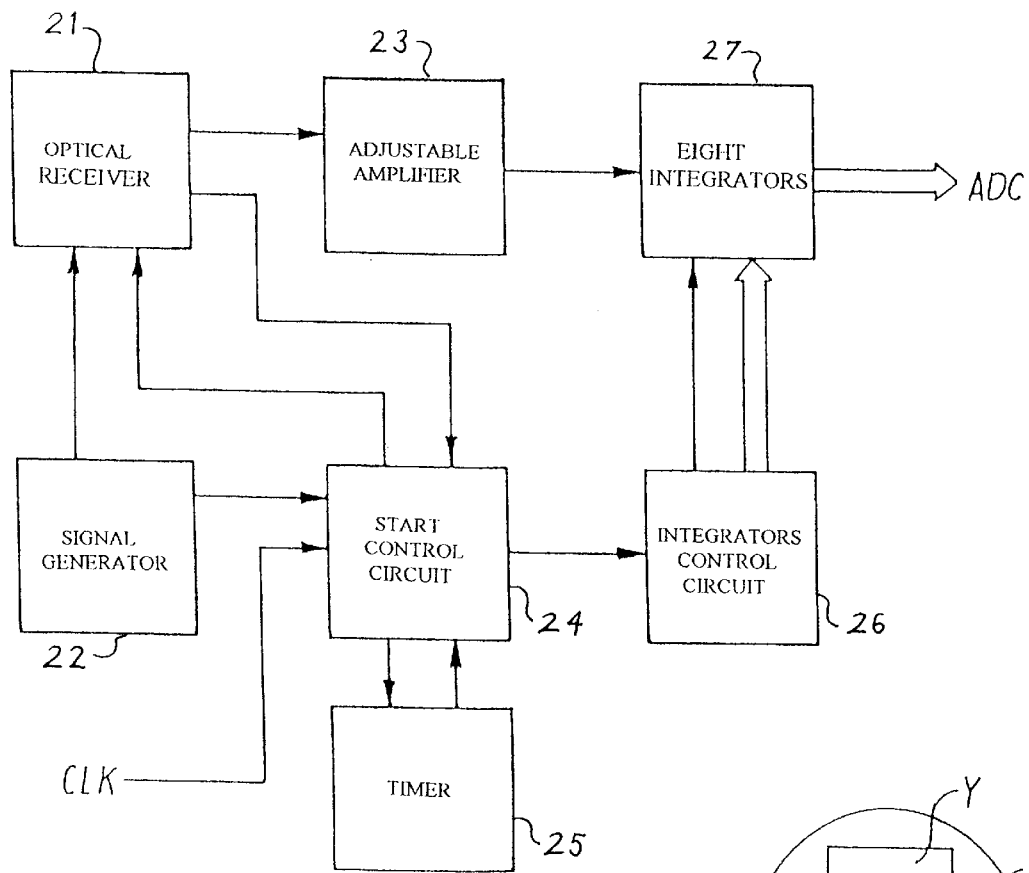
FIG. 2 is a functional diagram of an analog-digital converter usable with the apparatus of FIG. 1.

FIG. 2 shows a functional diagram of an ADC (analog-digital converter). In this figure, 21 is the optical receiver, reference number 19 in FIG. 1; 22 is a signal generator; 23 is an adjustable amplifier; 24 is a start control circuit; 25 is a timer; 26 is an integrators control circuit; and 27 are eight integrators. In the drawings the following abbreviations are used. SI is the serial input of the optical receiver 21, whilst SO is the serial output of the receiver 21. AO is the analog output. $t_{int}$ is the integrated time of the receiver 21. RS is the read pulse signal.

The converter circuit (FIG. 2) controls the functioning of the optical receiver 21, and converts the output signal therefrom. The clock pulse signals from the generator 22 are fed to the clock (CLK) input of the optical receiver 21.

When a pulse is fed from the circuit 24 to the serial input (SI) of the receiver 21, a serial output (SO) pulse is generated at the optical receiver output. This pulse is applied via the start control circuit 24 to the input SI. When the clock pulse signal (CLK) is received, the chip X to be analysed must be located in a required position. The color of the chip X is analysed thereacross for a movement of approximately 15 mm of the holder 13 relative to the lamp 11 and other components.

With the arrival of the CLK pulse signal, no more pulse signals are delivered to the SI input and the timer 25 starts its operation. The timer 25 determines the integration time $t_{int}$ of the receiver 21. During $t_{int}$, information on the spectrum from the chip X is accumulated. Subsequently the timer 25 sends the read pulse signal RS which passes through the circuit 24 and is applied to the SI triggering the retrieval and accumulation of information concerning a spectra of the chip X.

Figure 4:
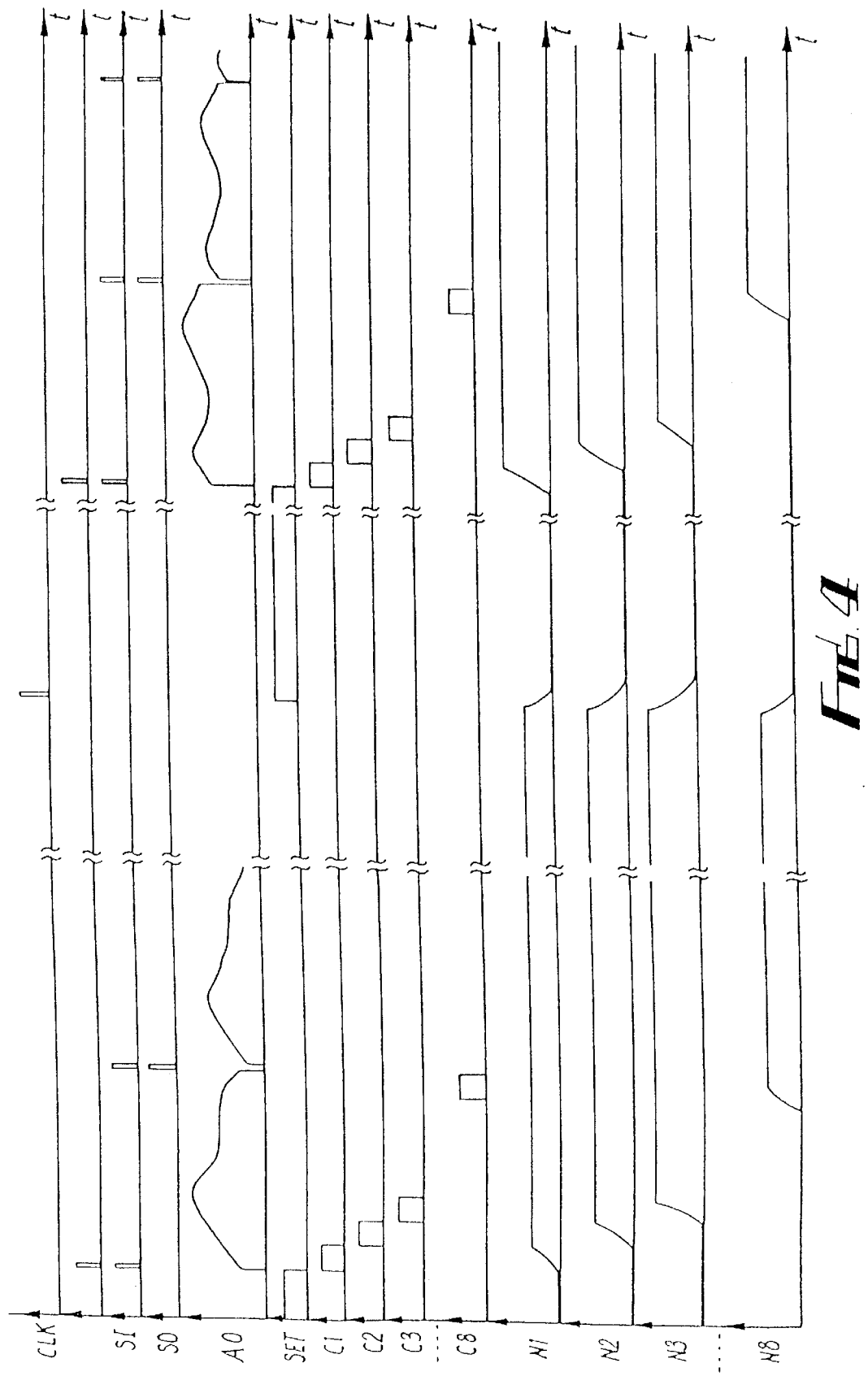

The analog signal from AO proportional to the integral spectrum of the scattered light of the chip passes via the amplifier 23 and is applied to the eight integrators 27. The pulse RS from the timer 25 is delivered to the integrators control circuit 26 and the receiver 21. The circuit 26 applies the signal from the receiver 21 in consecutive order to each of the integrators 27. On arrival of the control pulse signal C1 (FIG. 4), data from the first to eighth pixels of the receiver 21 are integrated in the first integrator N1 (FIG. 4). Data from the nineth to sixteenth pixels of the receiver 21 are integrated in the second integrator N2 upon arrival of the signal C2 and so on. Finally, data from the fifty sixth to sixty fourth pixels of the receiver 21 are integrated in N8. The information stored in all eight integrators until the arrival of the next signal CLK, following which the circuit 26 generates a reset signal (SET-FIG. 4). The integrators 27 are reset and cleared of information before the arrival of the signal RS from the timer 25.

When the next chip to be analysed is passing in front of the sensing arrangement shown in FIG. 1, the cycle of the next analog signal of the receiver 21 proceeds to its completion in a similar manner as shown on the second half of the diagram in FIG. 4. The signal SO from the receiver 21 which is generated after the retrieval and partial erasure of the information passes through the circuit controlling the receiver 21 and is applied to the input SI thereof. The readout and partial erasure of the remaining information in the receiver 21 is effected again. The signal SO is again delivered to the SI input and so on. A complete erasure of the accumulated information will take place before the arrival of the next clock pulse signal.

Figure 5:
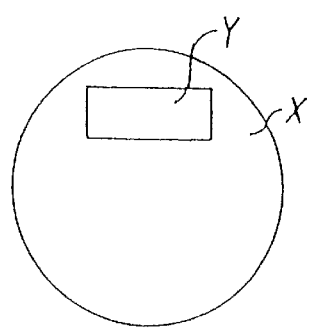
FIG. 5 is a diagrammatic plan view of an article the color of which can be sensed using the apparatus of FIG. 1.
Figure 3:
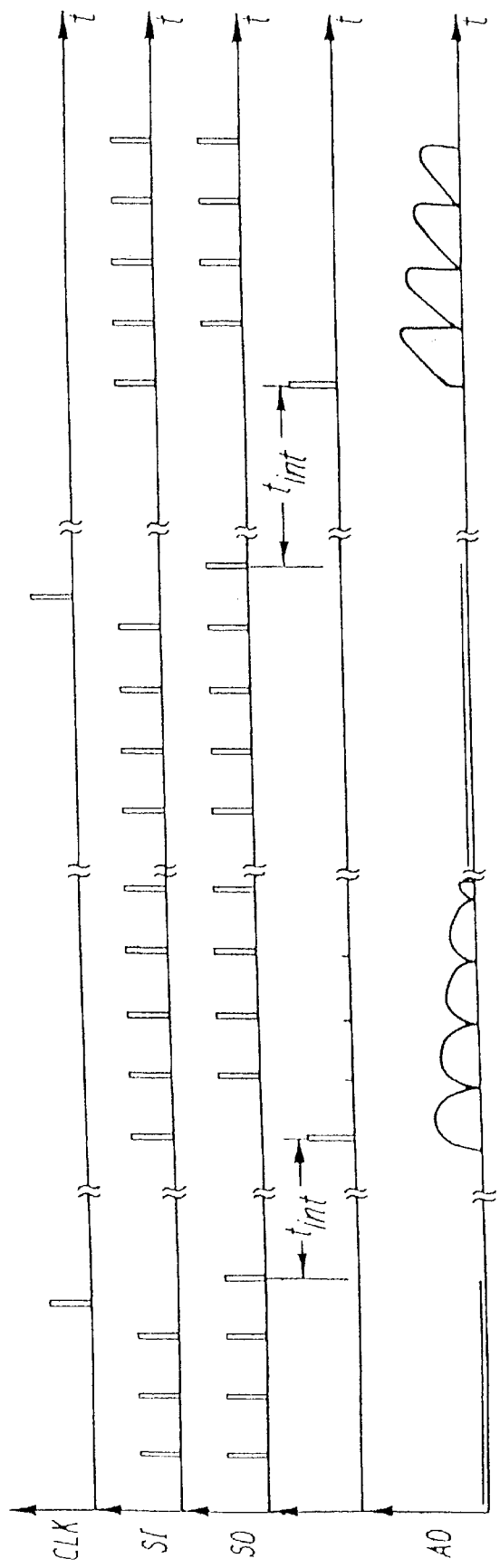
FIGS. 3 and 4 are timing diagrams of the apparatus of FIGS. 1 and 2 in use.

In the particular example described, the spectral composition of the scattered light from the chip X from an area measuring approximately 1×3 mm is measured each time. As the chip X moves relative to the sensor, the color of the chip X is measured fifteen times such that the integrated spectrum of the chip X is obtained from an area Y of the chip X measuring 3×15 mm (FIG. 5).

This arrangement of measuring the color of the chip at a number of locations, in this instance fifteen, across the chip and integrating the results obtained provides for an increased accuracy of color measurement. This arrangement also helps to reduce the effect of spurious color results due perhaps to particular color abberations or dirt on the chip.

With a chip sorting device as described in the above mentioned co-pending application of the applicants, the apparatus would first be set by recording the colors of required test chips. Usually a number of different colored test chips would be measured by a method as described above. Normally a number of each color of test chip would be measured and/or each chip may be measured a number of times. Each test chip would be allocated to a particular location in the sorting device, and chips subsequently measured which correspond to one of the test chips would automatically be directed to the required location.

With certain types of chips which have a relatively complex arrangement of colors thereon, perhaps with a central portion of a different color and bands of different colors, conventional color detection methods have not been usable. However, if a plurality of test chips are detected, or a single chip detected on a number of occasions, with the or each chip in a different orientation for each detection, then, and particularly using the method of measuring the spectra across the chip at a number of locations and integrating the values received, and desirably also dividing the spectra into a number of bands and integrating the values within each band, such chips can be reliably detected and sorted using the present invention.

There is thus described a method of detecting the color of articles and sorting the articles in response to the color detected with a number of advantageous features. Whilst example has been described in relation to sorting gambling chips, it is to be realised that this systems could be used with a wide variety of different products, and particularly rotary symetrical products.

Various modifications may be made without departing from the scope of the invention. For example, a different number of readings across the article could be made. A different color detection arrangement could be used. The color detection system rather than the article being tested could be moved to provide readings at different locations.

Whilst endeavouring in the foregoing Specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of identification of articles of a plurality of colors comprising:
    a) sequentially relatively positioning a color sensor and an article in each of a plurality of relative orientations;
    b) detecting the color of the article at each of the orientations to produce signals representative of the color detected; and,
    c) integrating the signals to produce a color identifying output and thereby identifying the article by its color.

2. A method according to claim 1, characterised in that for each detection, the color of the article is sensed at a plurality of places on the article and the color measured is integrated with respect to the number of places sensed.

3. A method according to claim 2, characterised in that the article is moved relative to the sensor the color of the article, during the sensing, to provide the sensing at different places across the article, and the color measured is integrated with respect to time.

4. A method according to claim 2, characterised in that the color sensor divides light received from the article into at least one spectra, and the relative intensities across each spectra are measured to determine the color.

5. A method according to claim 4, characterised in that the or each spectra measured are divided into bands across the spectra.

6. A method according to claim 5, characterised in that the color measured across each band is integrated.

7. A method according to claim 6, characterised in that the color measured across each band is integrated with respect to the frequency in each band.

8. A method according to claim 4, characterised in that the or each spectra measured are converted into discrete spectra.

9. A method of sorting articles by virtue of their color according to claim 1, characterised in that the method comprises determining the color of at least one test article by the method according to claim 1, determining the color of an article to be sorted by said method, and comparing the color measurements obtained to ascertain whether the article to be sorted corresponds to the at least one of the test articles.

10. A method according to claim 9, characterised in that a plurality of test articles of each of the colors for which sorting is required are measured.

11. A method according to claim 9, characterised in that a single test article of each color for which sorting is required is measured a plurality of times.

* * * * *